United States Patent
Zhang et al.

(10) Patent No.: US 11,889,341 B2
(45) Date of Patent: Jan. 30, 2024

(54) METHOD AND APPARATUS FOR MANAGING ROADSIDE DEVICE IN VEHICLE ROAD COOPERATION, AND CLOUD CONTROL PLATFORM SYSTEM

(71) Applicant: Apollo Intelligent Connectivity (Beijing) Technology Co., Ltd., Beijing (CN)

(72) Inventors: Zhuhua Zhang, Beijing (CN); Shipeng Song, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 33 days.

(21) Appl. No.: 17/703,336

(22) Filed: Mar. 24, 2022

(65) Prior Publication Data

US 2022/0353728 A1 Nov. 3, 2022

(30) Foreign Application Priority Data

Apr. 30, 2021 (CN) .......................... 202110485178.X

(51) Int. Cl.
*H04W 28/02* (2009.01)
(52) U.S. Cl.
CPC .............................. *H04W 28/0231* (2013.01)
(58) Field of Classification Search
CPC .................................................. H04W 28/0231
See application file for complete search history.

(56) References Cited

U.S. PATENT DOCUMENTS

2015/0222708 A1* 8/2015 Addepalli ........... H04L 61/2592
709/217
2016/0142492 A1* 5/2016 Fang ..................... H04W 4/021
370/254
(Continued)

FOREIGN PATENT DOCUMENTS

| CA | 3057015 A1 | 3/2021 |
| CN | 103116995 A | 5/2013 |

(Continued)

OTHER PUBLICATIONS

WO_2020063085_A1_Liu—English Translation (Year: 2020).*
(Continued)

*Primary Examiner* — Mohammad S Adhami
*Assistant Examiner* — Weibin Huang
(74) *Attorney, Agent, or Firm* — ArentFox Schiff LLP

(57) ABSTRACT

Embodiments of the present disclosure provide a method and apparatus for managing a roadside device in vehicle road cooperation, a cloud control platform and a system. The method includes: acquiring, by a cloudside device, a data packet from a roadside device, the data packet including at least one of state information of the roadside device and dynamic traffic information associated with the roadside device; and adjusting a packet transmission policy for a data link associated with the roadside device based on the data packet, the data link comprising at least one of a first downlink from the roadside device to a vehicle, a first uplink from the vehicle to the roadside device, a second uplink from the roadside device to the cloudside device, and a second downlink from the cloudside device to the roadside device, so that personalized management for roadside devices is achieved.

17 Claims, 2 Drawing Sheets

(56) References Cited

U.S. PATENT DOCUMENTS

2018/0025630 A1* 1/2018 Matsumoto ............ G08G 1/065
340/909
2021/0125490 A1 4/2021 Yu et al.

FOREIGN PATENT DOCUMENTS

| CN | 109286863 A | 1/2019 | |
|---|---|---|---|
| CN | 110557340 A | 12/2019 | |
| CN | 110738851 A | 1/2020 | |
| CN | 111862655 A | 10/2020 | |
| JP | 2003208693 A | 7/2003 | |
| JP | 2008109210 A | 5/2008 | |
| JP | 2016167202 A | 9/2016 | |
| WO | WO-2017049975 A1 * | 3/2017 | |
| WO | 2017133501 A1 | 8/2017 | |
| WO | WO-2020063085 A1 * | 4/2020 | ........... G08G 1/0108 |
| WO | 2021028051 A1 | 2/2021 | |

OTHER PUBLICATIONS

WO_2017049975_A1_Xu—English Translation (Year: 2017).*
Japanese Office Action in JP2022074336, dated May 23, 2023, 5 pages.
Chinese Search Report in CN202110485178X, dated May 23, 2023, 3 pages.

* cited by examiner

METHOD AND APPARATUS FOR MANAGING ROADSIDE DEVICE IN VEHICLE ROAD COOPERATION, AND CLOUD CONTROL PLATFORM SYSTEM

CROSS-REFERENCE TO RELATED APPLICATIONS

The present application claims priority to Chinese Patent Application No. 202110485178.X, filed on Apr. 30, 2021, the disclosure of which is hereby incorporated by reference in entirety.

TECHNICAL FIELD

Embodiments of the present disclosure mainly relate to the field of intelligent traffic, and in particular to a vehicle road cooperation technology, and more particularly, to a method and apparatus for managing a roadside device in vehicle road cooperation, and a cloud control platform and system.

BACKGROUND

In recent years, an intelligent transportation system (ITS) technology develops more and more rapidly, and adopts advanced science and technology to take into comprehensive consideration of systems such as roads, traffic, human and environments involved, so as to implement intelligent traffic management. Generally, an intelligent transport system (ITS) includes three parts: a vehicle end, a road end and a cloud end, and the three parts cooperate with each other to provide different services for different types of vehicles. Therefore, how to achieve the vehicle, road and cloud cooperation, i.e. the efficient cooperation of the vehicle end, the road end and the cloud end, has become the focus of current attention.

SUMMARY

According to at least some embodiments of the present disclosure, solutions for managing a roadside device are provided.

In an embodiment of the present disclosure, a method for managing a roadside device is provided. The method includes: acquiring, by a cloudside device, a data packet from a roadside device, the data packet including at least one of state information of the roadside device and dynamic traffic information associated with the roadside device; and adjusting a packet transmission policy for a data link associated with the roadside device based on the data packet, the data link including at least one of a first downlink from the roadside device to a vehicle, a first uplink from the vehicle to the roadside device, a second uplink from the roadside device to the cloudside device, and a second downlink from the cloudside device to the roadside device.

In another embodiment of the present disclosure, an electronic device is provided, including at least one processor; and a storage device for storing at least one program, and the at least one processor is configured to implement the method mentioned above when the at least one program is executed by the at least one processor.

In another embodiment of the present disclosure, a non-transitory storage medium storing a computer program is provided, and the computer program is used for implementing the method mentioned above when executed by a processor.

It should be understood that the content described in this summary section is not intended to limit the critical or critical features of embodiments of the present disclosure, nor is it intended to limit the scope of the disclosure. Other features of the present disclosure will be easily understood by the following description.

BRIEF DESCRIPTION OF THE DRAWINGS

The above and other features, advantages, and aspects of various embodiments of the present disclosure will become more apparent in combination with the accompanying drawings and with reference to the following detailed description. In the drawings, identical or similar reference numerals denote identical or similar elements.

DETAILED DESCRIPTION

Figure 1:
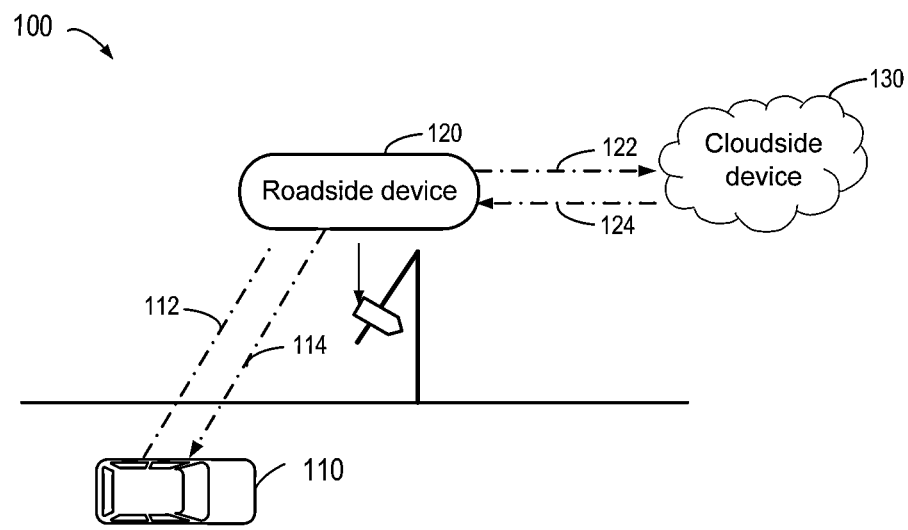
FIG. 1 shows a schematic diagram of an example environment in which various embodiments of the present disclosure is implemented.

Embodiments of the present disclosure will be described below in more detail with reference to the accompanying drawings. Although certain embodiments of the present disclosure are shown in the accompanying drawings, it should be understood that the present disclosure is implemented in various forms and should not be construed as being limited to the embodiments set forth herein. On the contrary, these embodiments are provided for a thorough and complete understanding of the present disclosure. It should be understood that the drawings and embodiments of the present disclosure are for illustrative purposes and are not intended to limit the scope of the present disclosure.

In the description of the embodiments of the present disclosure, the term "including" and the like should be understood as open-ended including, that is, "including but not limited to". The term "based on" should be understood as "based at least in part on". The term "one embodiment" or "the embodiment" is to be understood as "at least one embodiment". The terms "first", "second", "and the like can refer to different or identical objects. Other explicit and implicit definitions may also be included below.

As mentioned above, the intelligent transport system (ITS) includes three parts: a vehicle end, a road end and a cloud end, and the three parts cooperate with each other to provide different services for different types of vehicles. In a conventional ITS solution, a data packet is generally transmitted to a vehicle by using a lane coordination V2X communication technology, however different types of packets on different roadsides are not differentially controlled. This may result in insufficient resource utilization, and when resources such as a network conflict, an emergency message is also affected, which is not conducive to implementation of intelligent traffic and safe driving of a vehicle.

According to various at least some embodiments of the present disclosure, solutions of managing a roadside device are provided. In an embodiment of the present disclosure, the cloudside device acquires the data packet from the roadside device, and the data packet includes at least one of state information of the roadside device and dynamic traffic information associated with the roadside device. Correspondingly, the cloudside device adjusts a packet transmission policy for a data link associated with the roadside device based on the data packet, the data link including at least one of a first downlink from the roadside device to a vehicle, a first uplink from the vehicle to the roadside device, a second uplink from the roadside device to the cloudside device, and a second downlink from the cloudside device to the roadside device. Through this embodiment, the cloudside device can customize the packet transmission policy for the roadside device according to the data packet sent by the roadside device, thereby achieving personalized control for the roadside device, and providing the efficiency of the system.

Embodiments of the present disclosure will be specifically described below with reference to the accompanying drawings. FIG. 1 shows a schematic diagram of an example environment 100 in which various embodiments of the present disclosure is implemented.

As shown in FIG. 1, an environment 100 includes a vehicle 110, a roadside device 120 and a cloudside device 130. In this exemplary embodiment as shown in FIG. 1, a vehicle 110 may be any type of vehicle that may carry people and/or things and moves through a power system such as an engine, including but not limited to, a car, a truck, a bus, an electric car, a motorcycle, a house and a train. The at least one vehicle 110 in the environment 100 may include an autopilot vehicle having autonomous driving capability, a networked vehicle having communication capability, or an ordinary public driving vehicle.

As shown in FIG. 1, the roadside device 120 may be in communication with the vehicle 110 to send traffic information to the vehicle 110 or to acquire data from the vehicle 110.

In some implementations, the link for communication between the roadside device 120 and the vehicle 110 may include a first uplink 112 from the vehicle 110 to the roadside device 120 or a first downlink 114 from the roadside device 120 to the vehicle 110.

The first uplink 112 is used for transmitting the data packet from the vehicle 110 to the roadside device 120. The first downlink 114 is used for transmitting the data packet from the roadside device 120 to the vehicle 110. In some implementations, the first uplink 112 and the first downlink 114 are used for transmitting the packet according to the V2X standard.

As shown in FIG. 1, the roadside device 120 may be also in communication with a cloudside device 130. In some implementations, the link for communication between the roadside device 120 and the cloudside device 130 may include a second uplink 122 from the roadside device 120 to the cloudside device 130 and a second downlink 124 from the cloudside device 130 to the roadside device 120. The second uplink 122 is used for transmitting the data packet from the roadside device 120 to the cloudside device 130. The second downlink 124 is used for transmitting the data packet from the cloudside device 130 to the roadside device 120.

In some implementations, the second uplink 122 is further divided into a roadside state information uplink and a roadside service data uplink according to different functions. For example, the roadside 120 periodically reports operation state, version information, geographical position and abnormal information to the cloudside device 130 through the roadside state information uplink.

In some implementations, the roadside device 120 may report the state information of the roadside device 120 to the cloudside device 130 through the roadside state information uplink according to a packet format specified in Table 1.

Table 1 Shows State Information

| field name | field specification | field type | mandatory | Remarks |
|---|---|---|---|---|
| rsulist | | | | |
| rsuId | device number | String | M | |
| online | online or not | Integer | M | 0: online |
| longitude | device longitude | double | | |
| latitude | device latitude | double | | |
| altitude | device height | double | | |
| state | operation properly or not | Integer | M | 0: normal; 1: abnormal |
| timestamp | time stamp | Long | M | unit millisecond |
| sensorList: one rsu device may access multiple sensor devices | | | | |
| sensorId | device number | String | M | |
| online | online or not | Integer | M | 0: Online, 1: offline |
| type | device type | Integer | | sensor type 0-camera 1-laser radar 2-millimeter wave radar 3-signal collector |
| longitude | device longitude | double | | |
| latitude | device latitude | double | | |
| altitude | device height | double | | |
| state | operation properly or not | Integer | M | 0: normal; 1: abnormal |

As shown in Table 1, the state information may include identification of the roadside device 120, operation state, mounting location, abnormality information, and information of a sensor device to which the roadside device 120 is accessed.

The roadside 120 may report dynamic traffic information to the cloudside device 130 through the roadside service data uplink the roadside 120. In some implementations, the dynamic traffic information may include traffic participant information. The roadside device 120 may report the traffic participant information to the cloudside device 130 according to a packet format specified in Table 2. Such road participants may include any suitable road participant of various types of vehicles, pedestrians, or pets.

Table 2 Shows Traffic Participant Information

| field name | field specification | field type | mandatory | Remarks |
|---|---|---|---|---|
| obstacleList: traffic participant information, which is sent together by multiple rsu traffic participants, and may also be sent separately | | | | |
| rsuId | device number | String | M | |
| timestamp | time stamp | Long | M | unit millisecond |
| rsuObstacle: List of traffic participants on a single rsu | | | | |
| obstacleId | Traffic participant ID | Integer | M | a unique ID of a traffic participant under an rsu, the ID of the traffic participant being ensured by a data source and being used for describing the unique ID of the traffic participant |
| type | traffic participant type | Integer | M | For definition of traffic participant, see Appendix B |
| vehicleState | sensing vehicle state | Integer | | 0\|non-sensing vehicle or normal state 1\|reverse vehicle 2\|overspeed vehicle 3\|Emergency braking vehicle 4\|Illegal parking |
| longitude | longitude | double | M | longitude of the road participant (WGS84) |
| latitude | latitude | double | M | latitude of the traffic participant (WGS84) |
| altitude | elevation | double | | elevation of the road participant |
| heading | angle of course | Float | M | The angle of the course deviation from true north, the forward pointer is positive, the range is 0-360 degrees |
| speed | speed | Float | M | Speed of road participant, km/h |
| polygon | Traffic participant corner description | JSON Array | | is described in terms of a set of longitude and latitude points |
| len | Length of target size | Short | | unit cm |
| width | width of target size | Short | | unit cm |
| height | Height of target dimension | Short | | unit cm |

As shown in Table 2, the traffic participant data may include various information for describing the traffic participant in the environment associated with the roadside device 120, e.g., identity, type, location, size, motion information, etc.

In some implementations, dynamic traffic information may further include traffic event information. The roadside device 120 may upload the traffic event information to the cloudside device 130 according to a packet format specified in Table 3. Such traffic events may include any suitable type of traffic event such as a vehicle reversing, traffic jam, road construction, road regulation, a traffic accident, etc.

Table 3 Shows Traffic Event Information

| field name | field specification | field type | mandatory | Remarks |
|---|---|---|---|---|
| eventList: a list of rsu events, in which multiple rsu events is packaged and sent together, and may also be sent according to the rsu | | | | |
| rsuId | device number | String | M | |
| timestamp | time stamp | Long | M | unit millisecond |
| rsuEvent: list of events on a single rsu | | | | |
| eventId | Event ID | Integer | M | Unique identification field of events in the same time period (ID of events reported in different cycles is repeated) |
| type | event type | Integer | M | For definition of event type, see Appendix A |
| longitude | longitude | double | M | longitude of central point of occurrence of event |
| latitude | latitude | double | M | Latitude of event occurrence center point |
| altitude | device height | double | | |
| heading | angle of course | Float | | angle of heading deviation from true north clockwise |
| speed | speed | Float | | Vehicle speed |
| radius | Radius | Float | | event influence radius |
| polygon | event area description | JSON Array | | An event area description, a set of points, and a format of [112.95253828541985, 28.32815898002754], [112.95253828541985, 28.32815898002754]], is a closed area description, can also be a linear description, and describes a path by using an ordered set of points. |

-continued

| field name | field specification | field type | mandatory | Remarks |
|---|---|---|---|---|
| | | | | For example:<br>with regard to events such as vehicle reversing, a real-time latitude and longitude point of a vehicle is selected for description;<br>with regard to the description of linear events such as congestion, in addition to using latitude and longitude to describe a central point, polygen is used for describing an initial position of an event<br>With regard to a regional event of a road construction type, in addition to using latitude and longitude for describing a central point, polygen is used for describing a specific region of the event |

As shown in Table 3, the traffic event information may include various information for describing a traffic event in an environment associated with the roadside device 120, such as, an event identification, an event type, an event location, an event impact radius, and an event area.

In some implementations, dynamic traffic information may further include traffic flow and traffic index information. The roadside device 120 may upload traffic flow and traffic index information to the cloudside device 130 according to a packet format specified in Table 4.

Table 4 Shows Traffic Flow and Traffic Index Information

| field name | field specification | field type | mandatory | Remarks |
|---|---|---|---|---|
| | trafficFlowList: multiple roadside traffic flow and traffic index data | | | |
| rsuId | device number | String | M | |
| timestamp | time stamp | Long | M | unit millisecond |
| | laneTrafficFlowList: traffic flow and traffic index data of single roadside | | | |
| laneId | lane number | Integer | | Lane Description Mode 1 |
| | startPos: lane starting coordinate point, single coordinate, and second lane description mode | | | |
| longitude | starting longitude | double | | |
| latitude | starting latitude | double | | |
| | endPos: end of lane coordinate point, single coordinate, and second lane description mode | | | |
| longitude | terminal strength | double | | |
| latitude | terminal latitude | double | | |
| polygenList | continuous lane coordinate description | List<List<Double>> | | Lane description mode III, coordinate list |
| density | lane integrating vehicle flow traffic flow at intersection entrance traffic flow in different directions at the intersection queue length of different flow directions at the intersection queue length of different lanes at the intersection | Integer | | lane level cumulative number within 1 min |

As shown in Table 4, traffic flow and traffic index information may include various data for describing traffic flow and traffic index in an environment associated with the roadside device 120, such as traffic flow in different directions of an intersection, the number of vehicles in a lane within one minute, etc.

In some implementations, dynamic traffic information may further include other suitable types of information, such as signal light information, road network information, etc. It should be understood that any suitable packet format is used for transmitting the above information, which will not be described in detail herein.

In some implementations, the cloudside device 130 may adjust the packet transmission policy for the data link (e. g., the first uplink 112, the first downlink 114, the second uplink 122, or the second downlink 124) associated with the roadside device 120 according to state information or dynamic traffic information obtained from the roadside device 120. A detailed process of adjusting the packet transmission policy is described in detail below with reference to FIG. 2.

Figure 2:
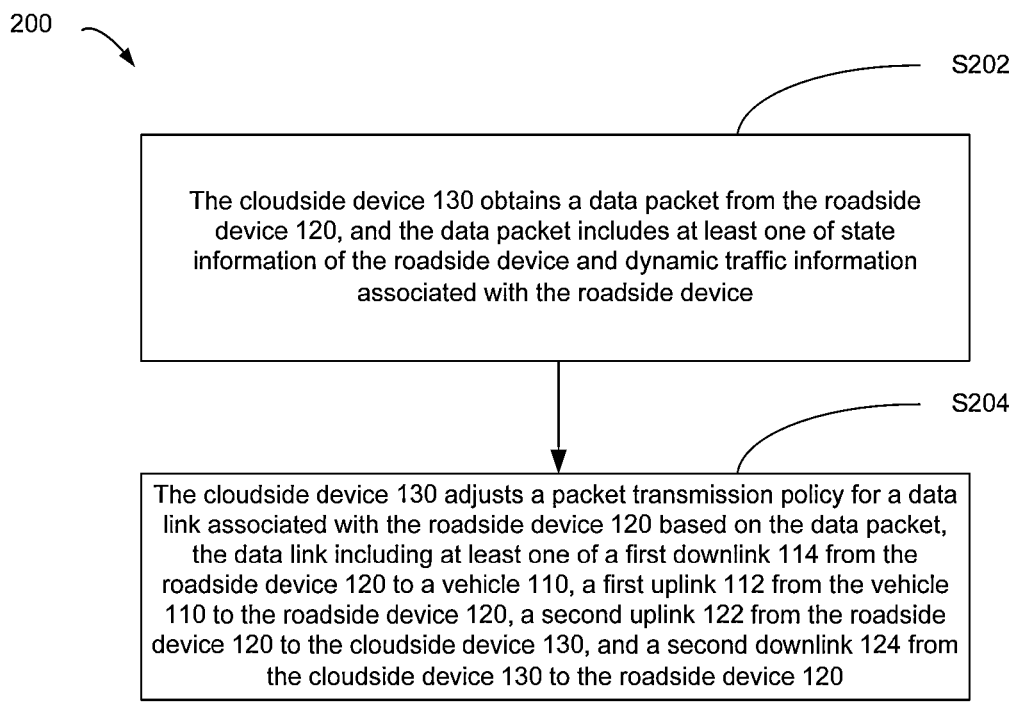
FIG. 2 shows a flowchart of a method for managing a roadside device according to some embodiments of the present disclosure.

FIG. 2 shows a flowchart of a method 200 for managing a roadside device according to some embodiments of the present disclosure. The method 200 is implemented at the cloudside device 130 as shown in FIG. 1.

As shown in FIG. 2, at block 202, the cloudside device 130 obtains a data packet from the roadside device 120, and the data packet includes at least one of state information of the roadside device and dynamic traffic information associated with the roadside device.

As discussed above as shown in FIG. 1, the cloudside device 130 may receive the data packet from the roadside device 120 through the second uplink 122. The data packet may include state information as defined in Table 1, traffic participant information as defined in Table 2, traffic event information as defined in Table 3, or traffic flow and traffic index information as defined in Table 4, etc.

In block 204, the cloudside device 130 adjusts a packet transmission policy for a data link associated with the roadside device 120 based on the data packet, the data link including at least one of a first downlink 114 from the roadside device 120 to a vehicle 110, a first uplink 112 from the vehicle 110 to the roadside device 120, a second uplink 122 from the roadside device 120 to the cloudside device 130, and a second downlink 124 from the cloudside device 130 to the roadside device 120.

The detailed process of block 204 will be described below for different embodiments.

Embodiment One

In the embodiment one, the cloudside device 130 may adjust the packet transmission policy of the data link associated with the roadside device 120 based on the communication state of the roadside device 120.

Exemplarily, the data packet received by the cloudside device 130 may include state information for indicating a communication state of the roadside device 120. The communication state may be used for describing whether the communication module of the roadside device 120 is operating normally.

In some implementations, based on the data packet, in response to determining that the communication module of the roadside device 120 operates abnormally, the cloudside device 130 may adjust the packet transmission policy so that the first downlink 114 is at least partially disabled and the roadside device 112 stops sending service data to the vehicle 110. Based on this manner, erroneous control of the vehicle 110 due to communication abnormality of the roadside device 120 is avoided.

Alternatively, based on the data packet, in response to determining that the communication module of the roadside device 120 operates abnormally, the cloudside device 130 may adjust the packet transmission policy so that the second downlink 124 is at least partially disabled and the roadside device 112 stops sending service data to the vehicle 110.

In some implementations, the second downlink 124 is used for transmitting control information and service data information. Accordingly, in response to the communication abnormality of the roadside device 120, the function of the traditional control information is retained and the transmission of the service data information is disabled. Based on this manner, as the roadside device 120 will not deliver service data to the traffic device, disabling the transmission of service data information for the second downlink 124 can avoid unnecessary communication overhead.

In some implementations, the second uplink 122 is turned on to continue to receive service data from the roadside device 120, such as traffic participant information, traffic event information, or traffic flow and traffic index information.

Embodiment Two

In the embodiment two, a cloudside device 130 may adjust the packet transmission policy of the data link associated with the roadside device 120 based on a computation state of the roadside device 120.

Exemplarily, the data packet received by the cloudside device 130 from the roadside device 120 includes state information for indicating the computation state of the roadside device 120. The computation state may describe whether a computation module of the roadside device 120 operates normally.

In some implementations, based on the data packet, in response to determining that the computation module of the roadside device 120 operates abnormally, the cloudside device 130 may adjust the packet transmission policy so that the second downlink is at least partially disabled and the roadside device 120 stops sending service data to the cloudside device.

The service data, such as traffic participant information, traffic event information, or traffic flow and traffic index information, sent by the roadside device 120 usually depends on the local computation capability of the roadside device 120. Once the computation module of the roadside device 120 operates abnormally, the service data computed by the roadside device 120 may be erroneous. Partially disabling the second uplink 124 can avoid having an impact on the data aggregation of the cloudside device 130 due to the abnormality of a computation module.

In some implementations, when a computation module of the roadside device 120 operates abnormally, at least one of the second downlink 122 and the first downlink 124 is normally enabled to support issuing service data from the cloudside device 130 to the vehicle 110.

Embodiment Three

In the embodiment three, the state information may further include a static description of the traffic environment associated with the roadside device 120. For example, such a static description may include the type of road on which the roadside device 120 is located, e.g., a city road, a road intersection, a highway, etc. Accordingly, the cloudside device 130 may adjust the packet transmission policy according to a type of road associated with the roadside device 120.

In some implementations, the cloudside device 130 may specify a type of packet allowed to be transmitted or prohibited from being transmitted on the data link for different types of roads. For example, when the roadside device 120 is located in a highway environment, and typically has a low demand for traffic flow information on the highway, the cloudside device 130 may enable packet associated with traffic flow to no longer be transmitted in the at least one of first downlink 114, the second uplink 122, and the second downlink 124.

In some implementations, the cloudside device 130 may further determine power, frequency, or priority of different packets transmitted on the data link for different types of roads.

For example, when the roadside device 120 is located in a highway environment, and typically has a low demand for traffic flow information on the highway, the cloudside device 130 may enable a packet associated with the traffic flow to be transmitted with at least one of lower priority, lower frequency, and lower power to reduce occupancy of communication resources. On the contrary, in highway scenarios, the demand for traffic event information is usually strong, thus the cloudside device 130 may enable the packet associated with traffic flow to be transmitted with at least one of higher priority and higher power.

Based on this manner, the roadside device 120 can utilize limited communication resources more effectively, thereby improving the efficiency of the system.

Embodiment Four

In the embodiment four, the dynamic traffic information includes traffic participant information for describing traffic participants in the environment associated with the roadside device 120. Accordingly, the cloudside device 130 may adjust the packet transmission policy according to the traffic participant information.

In some implementations, the cloudside device 130 may specify a type of packet allowed to be transmitted or prohibited from being transmitted on the data link.

For example, in response to determining that an environment (such as, an intersection) does not include vehicle within a predetermined time, the cloudside device 130 may adjust a packet transmission policy so that a specific type of a packet (such as, a traffic light data packet) is no longer transmitted, thereby avoiding occupation of communication resources.

In some implementations, the cloudside device 130 may further determine power, frequency, or priority of different packets transmitted on the data link based on traffic participant information.

Exemplary, in response to determining that an environment (such as, an intersection) includes a large number of vehicles, the cloudside device 130 may adjust a packet transmission policy, thereby appropriately increasing a frequency of a traffic event packet and simultaneously and appropriately reducing power of the traffic event packet, and simultaneously reducing the frequency of a traffic light data packet, and increasing the power of the traffic light data packet.

Based on this manner, the roadside device 120 can utilize limited communication resources more effectively, thereby improving the efficiency of the system.

Embodiment Five

In the embodiment five, the dynamic traffic information includes traffic event information for describing a traffic event in the environment associated with the roadside device 120. Accordingly, the cloudside device 130 may adjust the packet transmission policy according to the traffic event information.

In some implementations, in response to determining that a specific type of traffic event has occurred in the environment associated with the roadside device 120, the cloudside device 130 may specify the type of packet allowed to be transmitted or prohibited from being transmitted on the data link.

For example, in response to determining that a road construction event occurs in an environment, as a traffic light may not operate normally, the cloudside device 130 may adjust a packet transmission policy so that a packet associated with traffic light is no longer transmitted.

In some implementations, in response to determining that a specific type of traffic event has occurred in the environment associated with the roadside device 120, the cloudside device 130 may further determine power, frequency, or priority of different packets transmitted on the data link based on the traffic event.

For example, in response to determining that a traffic accident occurs in the environment, it is expected that a driver at a farther distance may obtain the information. Accordingly, the cloudside device 130 may adjust a packet transmission policy so that a packet associated with a traffic accident is transmitted with at least one of higher priority, higher power, and higher frequency.

Based on this manner, the roadside device 120 can utilize limited communication resources more effectively, thereby improving the efficiency of the system.

Embodiment Six

In the embodiment six, the dynamic traffic information includes traffic flow and traffic event information for describing the traffic flow and traffic index in an environment associated with the roadside device 120. Accordingly, the cloudside device 130 may adjust the packet transmission policy according to the traffic flow and traffic index information.

In some implementations, the cloudside device 130 may specify a type of packet allowed to be transmitted or prohibited from being transmitted on the data link based on the traffic flow and traffic index information.

For example, in response to determining that the traffic flow is lower than the threshold, the cloudside device 130 may adjust the packet transmission policy so that packets of a predetermined type (e.g., road network information packets) are no longer transmitted.

In some implementations, the cloudside device 130 may further determine power, frequency, or priority of different packets transmitted on the data link based on traffic flow and traffic index information.

Exemplarily, in response to determining that traffic of an automobile in a lane is relatively heavy, the cloudside device 130 may adjust a packet transmission policy, thereby increasing at least one of frequency and priority of an event packet, and appropriately reducing power of the packet.

Based on this manner, the roadside device 120 can utilize limited communication resources more effectively, thereby improving the efficiency of the system.

It should be understood that the above-mentioned specific type of data link being disabled or enabled, the specific type of packet being disabled or enabled, and/or the specific type of packet being adjusted in priority or frequency or power are all exemplary, and it should be understood that, which specific type of data link should be enabled or disabled, which the type of the packet should be enabled or disabled, and which type of the packet should be adjusted at priority or frequency or power, etc., is set according to actual scenario requirements.

In some implementations, when the packet transmission policy involves the first uplink 112, the first downlink 114, or the second uplink 122, the cloudside device 130 may generate a control packet to the roadside device 120 based on the packet transmission policy.

Correspondingly, after receiving the control packet, the roadside device 120 may correspondingly execute a packet control policy corresponding to the control packet, so as to achieve the enabling or disabling of a data link of a predetermined type, the enabling or disabling of a packet of a predetermined type, the priority or frequency or power adjustment of a packet of a predetermined type, etc.

In some implementations, a basic processing flow of the cloudside device 130 may include: buffering a packet in a packet queue, performing an over-current processing and multi-thread processing, inputting result data into a packet queue and buffering same, then passing through a packet transmission policy configuration module, so as to set enabling or disabling of a data link, enabling or disabling of a packet, a sending frequency, sending power and a priority of the packet, and finally passing through an adaptation distribution module to different roadside devices 120.

Figure 3:
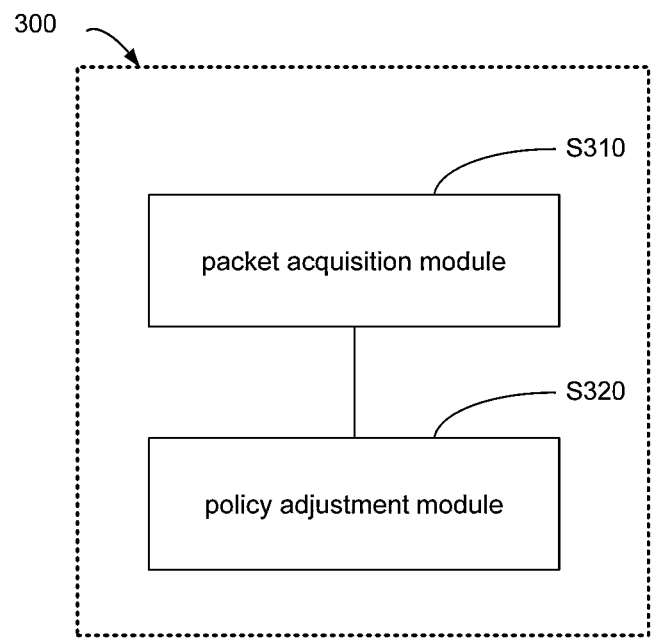
FIG. 3 shows a schematic structural block diagram of a cloudside device according to some embodiments of the present disclosure.

Embodiments of the present disclosure also provide corresponding apparatus for implementing the methods or processes described above. FIG. 3 shows a schematic structural block diagram of an apparatus 300 for managing a roadside device according to some embodiments of the present disclosure. The apparatus 300 is implemented at the cloudside device 130 as shown in FIG. 1.

As shown in FIG. 3, an apparatus 300 includes: a packet acquisition module 310, configured to acquire a data packet from a roadside device, the data packet including at least one of state information of the roadside device and dynamic traffic information associated with the roadside device. The device 300 further includes: a policy adjustment module 320, configured to adjust a packet transmission policy for a data link associated with the roadside device based on the data packet, the data link including at least one of a first downlink from the roadside device to a vehicle, a first uplink from the vehicle to the roadside device, a second uplink from the roadside device to the cloudside device, and a second downlink from the cloudside device to the roadside device.

In some implementations, when the data packet includes the state information indicating a communication state of the roadside device, the policy adjustment module 320 includes: a communication abnormality processing module, configured to execute at least one of the following in response the communication state being abnormal: enabling the first downlink to be at least partially disabled, so that the roadside device stops sending service data to the vehicle; or enabling the second downlink to be at least partially disabled, so that the cloudside device stops sending service data to the roadside device.

In some implementations, when the data packet includes the state information indicating a computation state of the roadside device, the policy adjustment module 320 includes a computation abnormality processing module, configured to enable the second uplink to be at least partially disabled in response to the computation state being abnormal, so that the roadside device stops sending service data to the cloudside device.

In some implementations, when the data packet includes the state information, the state information includes a static description of a traffic environment associated with the roadside device.

In some implementations, when the data packet includes the dynamic traffic information, the dynamic traffic information includes traffic participant information and the traffic participant information is used for describing a traffic participant in an environment associated with the roadside device.

In some implementations, when the data packet includes the dynamic traffic information, the dynamic traffic information includes traffic event information and the traffic event information is used for describing a traffic event in an environment associated with the roadside device.

In some implementations, when the data packet includes the dynamic traffic information, the dynamic traffic information includes traffic flow and traffic index information, and the traffic flow and the traffic index information are used for describing traffic flow and traffic index in an environment associated with the roadside device.

In some implementations, the policy adjustment module 320 includes a packet control module, configured to specify a type of packet allowed to be transmitted or prohibited from being transmitted on the data link based on the state information or the dynamic traffic information.

In some implementations, the policy adjustment module 320 includes a link control module, configured to determine power, frequency, or priority of different packets transmitted on a data link based on state information or dynamic traffic information.

In some implementations, the apparatus 300 includes: a communication module, configured to generate a control packet based on the packet transmission policy and send the control packet to the roadside device.

The units contained in the apparatus 300 is implemented in a variety of ways, including software, hardware, firmware, or any combination thereof. In some embodiments, at least one unit is implemented by using software and/or firmware, such as machine-executable instructions stored on a storage medium. In addition to or as an alternative to machine executable instructions, some or all of the units in an apparatus 300 is implemented, at least in part, by at least one hardware logic components. By way of example, and not limitation, illustrative types of hardware logic components that is used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The units shown in FIG. 3 are implemented partially or entirely as hardware modules, software modules, firmware modules, or any combination thereof. In particular, in some embodiments, the processes, methods, or processes described above is implemented by hardware in the storage system, or a host corresponding to the storage system, or other computing device independent of the storage system.

In some implementations, the apparatus 300 depicted in FIG. 3 and/or the cloudside device 130 discussed above can also be contained in a cloud-controlled platform to enable collaboration between a vehicle end, a road end, and a cloud end.

Figure 4:
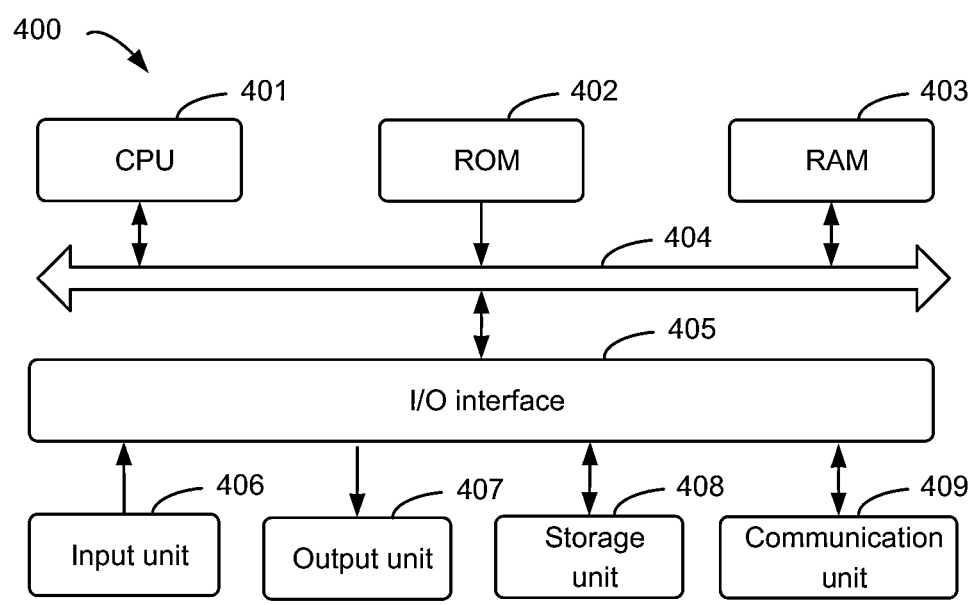
FIG. 4 shows a block diagram of a computing device capable of implementing various embodiments of the present disclosure.

FIG. 4 shows a schematic block diagram of an example device 400 that is used for implementing embodiments of the present disclosure. The device 400 is used for implementing the cloudside device 130. As shown in this figure, the device 400 includes a central processing unit (CPU) 401 that may perform various suitable actions and processes in accordance with computer program instructions stored in read only memory (ROM) 402 or computer program instructions loaded from storage unit 402 into random access memory (RAM) 403. In the RAM 403, various programs and data necessary for the operation of the storage device 400 can also be stored. The CPU 401, the ROM 402, and the RAM 403 are connected to each other via a bus 404. An input/output (I/O) interface 405 is also connected with the bus 404.

The various components in device 400 are connected to I/O interface 405, including an input unit 406, such as a keyboard and mouse; an output unit 407, such as various types of displays and speakers; a storage unit 408, such as a diskette and optical disk; and a communication unit 409, such as a network card, modem and wireless communication transceiver. The communication unit 409 allows the device 400 to exchange information or data with other devices through a computer network such as the Internet and/or various telecommunication networks.

The processing unit 401 performs the various methods and processes described above, such as method 200. For example, in some embodiments, the method 200 is implemented as a computer software program tangibly embodied on a machine-readable medium, such as the storage unit 408. In some embodiments, part or all of the computer programs is loaded into and/or mounted onto device 400 via ROM 402 and/or communications unit 409. When the computer program is loaded into the RAM 403 and executed by the CPU 401, at least one steps of the method 200 described above is performed. Alternatively, in other embodiments, the CPU 401 is configured to perform the method 200 in any other suitable manner (e.g., via firmware).

Program code for implementing the methodologies of the present disclosure is written in any combination of at least one programming languages. The program code is provided to a processor or controller of a general purpose computer, special purpose computer, or other programmable data processing apparatus, so that the program code, when executed by the processor or controller, causes the functions or operations specified in the flowchart and/or block diagrams to be performed. The program code can execute entirely on the machine, partly on the machine, as a stand-alone software package partly on the machine and partly on the remote machine or entirely on the remote machine or server.

In the context of the present disclosure, a machine-readable medium is tangible media that can contain or store a program for use by or in connection with an instruction execution system, apparatus, or device. The machine-readable medium is a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of machine-readable storage media may include an electrical connection based on at least one wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing.

In addition, while operations are depicted in a particular order, this should be understood as requiring that such operations be performed in the particular order shown or in sequential order, or that all illustrated operations be performed to achieve desirable results. In certain circumstances, multitasking and parallel processing is advantageous. Likewise, while several specific implementation details are included in the above discussion, these should not be construed as limiting the scope of the disclosure. Certain features that are described in the context of separate embodiments can also be implemented in combination in a single implementation. On the contrary, various features that are described in the context of a single implementation can also be implemented in multiple implementations separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are exemplary forms of implementing the claims.

What is claimed is:

1. A method for managing a roadside device, comprising:
   acquiring, by a cloudside device, a data packet from a roadside device, the data packet comprising at least one of state information of the roadside device and dynamic traffic information associated with the roadside device; and
   adjusting a packet transmission policy for a data link associated with the roadside device based on the data packet, the data link comprising at least one of a first downlink from the roadside device to a vehicle, a first uplink from the vehicle to the roadside device, a second uplink from the roadside device to the cloudside device, and a second downlink from the cloudside device to the roadside device;
   wherein when the data packet comprises the state information indicating a communication state of the roadside device, adjusting the packet transmission policy for the data link associated with the roadside device comprises:
      executing at least one of the following in response to the communication state being abnormal;
      enabling the first downlink to be at least partially disabled, so that the roadside device stops sending service data to the vehicle; and
      enabling the second downlink to be at least partially disabled, so that the cloudside device stops sending service data to the roadside device.

2. The method as claimed in claim 1, wherein when the data packet comprises the state information indicating a computation state of the roadside device, adjusting the packet transmission policy for the data link associated with the roadside device comprises:
   enabling the second uplink to be at least partially disabled in response to the computation state being abnormal, so that the roadside device stops sending service data to the cloudside device.

3. The method as claimed in claim 1, wherein when the data packet comprises the state information, the state information comprises a static description of a traffic environment associated with the roadside device.

4. The method as claimed in claim 3, wherein adjusting the packet transmission policy for the data link associated with the roadside device comprises:
   specifying a type of packet allowed to be transmitted or prohibited from being transmitted on the data link based on the state information or the dynamic traffic information.

5. The method as claimed in claim 3, wherein adjusting the packet transmission policy for the data link associated with the roadside device comprises:
   determining power, frequency or priority of different packets transmitted on the data link based on the state information or the dynamic traffic information.

6. The method as claimed in claim 1, wherein when the data packet comprises the dynamic traffic information, the dynamic traffic information comprises traffic participant information and the traffic participant information is used for describing a traffic participant in an environment associated with the roadside device.

7. The method as claimed in claim 1, wherein when the data packet comprises the dynamic traffic information, the dynamic traffic information comprises traffic event information and the traffic event information is used for describing a traffic event in an environment associated with the roadside device.

8. The method as claimed in claim 1, wherein when the data packet comprises the dynamic traffic information, the dynamic traffic information comprises traffic flow and traffic index information, and the traffic flow and the traffic index information are used for describing traffic flow and traffic index in an environment associated with the roadside device.

9. The method as claimed in claim 1, further comprising:
generating a control packet based on the packet transmission policy and sending the control packet to the roadside device, so that the roadside device performs a packet control policy corresponding to the control packet.

10. An electronic device comprising:
at least one processor;
a storage device for storing at least one program, wherein the at least one processor is configured to implement the following steps when the at least one program are executed by the at least one processor:
acquiring, by a cloudside device, a data packet from a roadside device, the data packet comprising at least one of state information of the roadside device and dynamic traffic information associated with the roadside device; and
adjusting a packet transmission policy for a data link associated with the roadside device based on the data packet, the data link comprising at least one of a first downlink from the roadside device to a vehicle, a first uplink from the vehicle to the roadside device, a second uplink from the roadside device to the cloudside device, and a second downlink from the cloudside device to the roadside device;
wherein when the data packet comprises the state information indicating a communication state of the roadside device, the at least one processor is further configured to implement the following steps:
executing at least one of the following in response to the communication state being abnormal;
enabling the first downlink to be at least partially disabled, so that the roadside device stops sending service data to the vehicle; and
enabling the second downlink to be at least partially disabled, so that the cloudside device stops sending service data to the roadside device.

11. The electronic device as claimed in claim 10, wherein when the data packet comprises the state information indicating a computation state of the roadside device, the at least one processor is further configured to implement the following steps:
enabling the second uplink to be at least partially disabled in response to the computation state being abnormal, so that the roadside device stops sending service data to the cloudside device.

12. The electronic device as claimed in claim 10, wherein the at least one processor is further configured to implement the following steps:
generating a control packet based on the packet transmission policy and sending the control packet to the roadside device, so that the roadside device performs a packet control policy corresponding to the control packet.

13. The electronic device as claimed in claim 10, wherein when the data packet comprises the state information, the state information comprises a static description of a traffic environment associated with the roadside device;

or, wherein when the data packet comprises the dynamic traffic information, the dynamic traffic information comprises traffic participant information and the traffic participant information is used for describing a traffic participant in an environment associated with the roadside device;

or, wherein when the data packet comprises the dynamic traffic information, the dynamic traffic information comprises traffic event information and the traffic event information is used for describing a traffic event in an environment associated with the roadside device;

or, wherein when the data packet comprises the dynamic traffic information, the dynamic traffic information comprises traffic flow and traffic index information, and the traffic flow and the traffic index information are used for describing traffic flow and traffic index in an environment associated with the roadside device.

14. A non-transitory storage medium storing a computer program, wherein the computer program is used for implementing the following steps when executed by a processor:
acquiring, by a cloudside device, a data packet from a roadside device, the data packet comprising at least one of state information of the roadside device and dynamic traffic information associated with the roadside device; and
adjusting a packet transmission policy for a data link associated with the roadside device based on the data packet, the data link comprising at least one of a first downlink from the roadside device to a vehicle, a first uplink from the vehicle to the roadside device, a second uplink from the roadside device to the cloudside device, and a second downlink from the cloudside device to the roadside device;
wherein when the data packet comprises the state information indicating a communication state of the roadside device, the computer program is further used for implementing the following steps:
executing at least one of the following in response to the communication state being abnormal;
enabling the first downlink to be at least partially disabled, so that the roadside device stops sending service data to the vehicle; and
enabling the second downlink to be at least partially disabled, so that the cloudside device stops sending service data to the roadside device.

15. The non-transitory storage medium as claimed in claim 14, wherein when the data packet comprises the state information indicating a computation state of the roadside device, the computer program is further used for implementing the following steps:
enabling the second uplink to be at least partially disabled in response to the computation state being abnormal, so that the roadside device stops sending service data to the cloudside device.

16. The non-transitory storage medium as claimed in claim 14, wherein the computer program is further used for implementing the following steps:
generating a control packet based on the packet transmission policy and sending the control packet to the roadside device, so that the roadside device performs a packet control policy corresponding to the control packet.

17. The non-transitory storage medium as claimed in claim 14, wherein when the data packet comprises the state information, the state information comprises a static description of a traffic environment associated with the roadside device;

or, wherein when the data packet comprises the dynamic traffic information, the dynamic traffic information comprises traffic participant information and the traffic participant information is used for describing a traffic participant in an environment associated with the roadside device;

or, wherein when the data packet comprises the dynamic traffic information, the dynamic traffic information comprises traffic event information and the traffic event information is used for describing a traffic event in an environment associated with the roadside device;

or, wherein when the data packet comprises the dynamic traffic information, the dynamic traffic information comprises traffic flow and traffic index information, and the traffic flow and the traffic index information are used for describing traffic flow and traffic index in an environment associated with the roadside device.

\* \* \* \* \*